(12) United States Patent
Zakonov et al.

(10) Patent No.: US 8,051,332 B2
(45) Date of Patent: Nov. 1, 2011

(54) EXPOSING APPLICATION PERFORMANCE COUNTERS FOR .NET APPLICATIONS THROUGH CODE INSTRUMENTATION

(75) Inventors: Alex Zakonov, Manchester, CT (US); Victor Mushkatin, West Hartford, CT (US)

(73) Assignee: Avicode Inc., Baltimore, MD (US)

( * ) Notice: Subject to any disclaimer, the term of this patent is extended or adjusted under 35 U.S.C. 154(b) by 174 days.

(21) Appl. No.: 12/503,313

(22) Filed: Jul. 15, 2009

(65) Prior Publication Data

US 2010/0037101 A1 Feb. 11, 2010

Related U.S. Application Data

(60) Provisional application No. 61/134,919, filed on Jul. 15, 2008.

(51) Int. Cl.
G06F 11/00 (2006.01)
(52) U.S. Cl. ...................................................... 714/38.1
(58) Field of Classification Search .............. 714/18–20, 714/26, 32, 33, 37–39, 45–47
See application file for complete search history.

(56) References Cited

U.S. PATENT DOCUMENTS

| | | | |
|---|---|---|---|
| 5,687,182 A | 11/1997 | Shikakura | |
| 6,134,710 A * | 10/2000 | Levine et al. | 717/158 |
| 6,467,052 B1 | 10/2002 | Kaler et al. | |
| 6,537,228 B1 | 3/2003 | Lambert | |
| 6,714,976 B1 | 3/2004 | Wilson et al. | |
| 7,224,686 B1 | 5/2007 | Doskow et al. | |
| 7,536,680 B2 * | 5/2009 | Berry et al. | 717/130 |
| 7,539,974 B2 | 5/2009 | Beck et al. | |
| 7,596,720 B2 * | 9/2009 | Curtis et al. | 714/38.13 |
| 7,761,556 B2 * | 7/2010 | Mills | 709/224 |
| 2002/0087949 A1 | 7/2002 | Golender et al. | |
| 2002/0198976 A1 * | 12/2002 | Davenport | 709/223 |
| 2003/0110253 A1 | 6/2003 | Anuszczyk et al. | |
| 2003/0195997 A1 | 10/2003 | Ibert et al. | |
| 2004/0046785 A1 | 3/2004 | Keller | |
| 2004/0049509 A1 | 3/2004 | Keller et al. | |
| 2004/0243981 A1 | 12/2004 | Luk et al. | |
| 2004/0250261 A1 | 12/2004 | Huibregtse | |
| 2004/0255272 A1 | 12/2004 | Ondrusek et al. | |
| 2004/0268302 A1 | 12/2004 | Srivastava et al. | |
| 2004/0268308 A1 | 12/2004 | Srivastava et al. | |
| 2005/0033766 A1 | 2/2005 | Pang et al. | |
| 2005/0114494 A1 | 5/2005 | Beck et al. | |
| 2005/0114848 A1 | 5/2005 | Choi et al. | |
| 2005/0138111 A1 * | 6/2005 | Aton et al. | 709/201 |
| 2005/0155019 A1 | 7/2005 | Levine et al. | |
| 2005/0155026 A1 | 7/2005 | DeWitt, Jr. et al. | |
| 2005/0172306 A1 | 8/2005 | Agarwal et al. | |
| 2005/0188269 A1 * | 8/2005 | El-Shimi et al. | 714/38 |
| 2005/0210454 A1 | 9/2005 | DeWitt, Jr. et al. | |
| 2006/0059474 A1 | 3/2006 | Bhansali et al. | |

(Continued)

*Primary Examiner* — Nadeem Iqbal
(74) *Attorney, Agent, or Firm* — Workman Nydegger

(57) ABSTRACT

Disclosed is a method for adding performance counters to a .NET application after compilation of the .NET application to Common Intermediate Language code without a requirement for code changes to the original .NET application code or application recompilation from the development side. With regard to a further aspect of a particularly preferred embodiment, the invention may provide a method for adding the performance counters by declarative instrumentation of a .NET application at runtime or compile time, without the need for an application developer to hardcode instrumentation logic into the application. An instrumentation configuration file provides declarative definition for performance counters that are to be added to a particular application, and particularly includes a complete list of performance counters that need to be added and settings for each performance counter.

16 Claims, 5 Drawing Sheets

U.S. PATENT DOCUMENTS

| | | |
|---|---|---|
| 2006/0112370 A1 | 5/2006 | Irving et al. |
| 2006/0136582 A1* | 6/2006 | Mills .......................... 709/224 |
| 2006/0150200 A1 | 7/2006 | Cohen et al. |
| 2006/0242627 A1 | 10/2006 | Wygodny et al. |
| 2007/0038974 A1 | 2/2007 | Albahari et al. |
| 2007/0074074 A1 | 3/2007 | Curtis et al. |
| 2007/0074150 A1 | 3/2007 | Jolfaei et al. |
| 2007/0094281 A1 | 4/2007 | Malloy et al. |
| 2007/0118336 A1 | 5/2007 | Parikh et al. |
| 2007/0261033 A1 | 11/2007 | Chen et al. |
| 2008/0114806 A1 | 5/2008 | Kosche |
| 2008/0167977 A1 | 7/2008 | Auvenshine et al. |
| 2008/0177756 A1 | 7/2008 | Kosche et al. |
| 2008/0184209 A1 | 7/2008 | LaFrance-Linden |
| 2008/0189687 A1 | 8/2008 | Levine et al. |
| 2008/0209005 A1 | 8/2008 | Akamatsu et al. |
| 2008/0209397 A1 | 8/2008 | Mohindra et al. |
| 2008/0229028 A1 | 9/2008 | Cascaval et al. |
| 2008/0270515 A1 | 10/2008 | Chen et al. |
| 2008/0307396 A1 | 12/2008 | Broman et al. |
| 2008/0313618 A1 | 12/2008 | Broman et al. |
| 2008/0317217 A1 | 12/2008 | Bernardini et al. |
| 2009/0089670 A1* | 4/2009 | Gooding et al. .............. 715/700 |
| 2009/0112559 A1 | 4/2009 | Christensen et al. |
| 2009/0138858 A1 | 5/2009 | Livshits et al. |

\* cited by examiner

EXPOSING APPLICATION PERFORMANCE COUNTERS FOR .NET APPLICATIONS THROUGH CODE INSTRUMENTATION

CROSS REFERENCE TO RELATED APPLICATIONS

This application is based upon and claims benefit of copending U.S. Provisional Patent Application Ser. No. 61/134,919 entitled "Exposing Application Performance Counters For .NET Applications Through Code Instrumentation", filed with the U.S. Patent and Trademark Office on Jul. 15, 2008 by the inventors herein, the specification of which is incorporated herein by reference.

FIELD OF THE INVENTION

This invention relates generally to application performance monitoring, and more particularly to exposing application performance counters by instrumenting application code at compile time or runtime.

DESCRIPTION OF THE BACKGROUND

Performance counters provide statistical information about application behavior. The information exposed through performance counters may be used by operations useful for, by way of non-limiting example: (i) debugging and troubleshooting performance and resource usage problems; (ii) tuning application configuration to achieve optimum performance; (iii) providing capacity management to properly scale applications according to business needs; and (iv) providing application health monitoring and service level monitoring.

Performance counters are essential for detecting and troubleshooting application issues related to high application load. The typical problems that are addressed by performance counters are slow performance and high consumption of shared resources such as CPU, network, memory, and file systems. In addition to those problems, performance counters can be used for warning about high usage of internal application resources. For example, for an application that uses an internal queue for storing requests, the application may provide a performance counter that will show percent of queue used. When usage goes above a predefined threshold, a warning to an administrator may be issued. Administrators may use performance counters to pinpoint a source of performance or resource usage problems. After resolution of a problem, administrators use performance counters to verify the resolution and ensure that the application has a healthy behavior.

In addition to using performance counters to troubleshoot problems, administrators can use performance counters in a proactive mode to analyze application runtime parameters and to fine tune the application configuration, environment configuration and hardware to achieve optimal performance.

Still further, performance counters may be used for capacity planning. To do a proper capacity planning, administrators need to be able to map business requirements for application performance and scalability into infrastructure requirements for memory, CPU power, network and so on. Performance counters allow quantifying user load placed on an application and the corresponding load placed on infrastructure resources. Typically, an application may need to provide a set of counters to measure the current load, such as number of users, number of transactions and so on. Performance counters for measuring load on resources are typically provided by an operating system or, in case of non-standard resources, by vendor applications.

Application health and service level monitoring is yet another area that may rely on information provided by performance counters. While information, warning, and error events report about important occurrences inside a monitored application, performance counters reflect the current state of an application in a quantifiable form. The first step for using performance counters for health monitoring is to define the "normal" behavior of an application and values for performance counters that correspond to the "normal" behavior. After that, critical deviations from normal behavior need to be identified. Most monitoring tools allow generating warning or error messages when the value of a performance counter crosses a threshold. An example of that can be monitoring for the amount of available memory and generating a warning when the application reaches a low level memory condition.

While performance counters are critical for application manageability and supportability, software development teams typically do not spend an appropriate amount of time on adding performance counters to their applications. Traditionally, application manageability requirements are considered optional and are treated with lower priority compared to functional or performance requirements. As a result, the majority of applications in production do not expose performance counters at all or expose an insufficient set of performance counters.

It would therefore be advantageous to provide a system and method by which performance counters could be added to an application after the application code has been authored, and without requiring changes to the finalized development code, thus adding an application management function to an application that would otherwise have none.

SUMMARY OF THE INVENTION

In accordance with one aspect of a particularly preferred embodiment, performance counters may be added to a .NET application after the fact without a requirement for code changes or application recompilation from the development side. With regard to a further aspect of a particularly preferred embodiment, the invention may provide a method for adding the performance counters by declarative instrumentation of a .NET application at runtime or compile time, without the need for an application developer to hardcode instrumentation logic into the application. An instrumentation configuration file provides declarative definition for performance counters that are to be added to a particular application, and particularly includes a complete list of performance counters that need to be added and settings for each performance counter.

DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE PREFERRED EMBODIMENT

The invention summarized above may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed herein are methods by which performance counters may be added to an application, such as a .NET application, after the application has been fully coded and without requiring code changes or application recompilation from the development side. Such performance counters may be added to such an application by declarative instrumentation of the application at either runtime or compile time. As used herein, an application is "instrumented" by inserting code that performs the necessary performance counter functions, such as uniquely naming each performance counter instance for a particular application method, extracting the necessary data from the method execution, etc., with such code insertion being carried out at compile time or runtime of the application. This code insertion process if referred to as "instrumenting" as it provides "instruments" for inserting performance counters into an already-compiled application and for collecting data necessary to provide an overall application management function.

Figure 1:
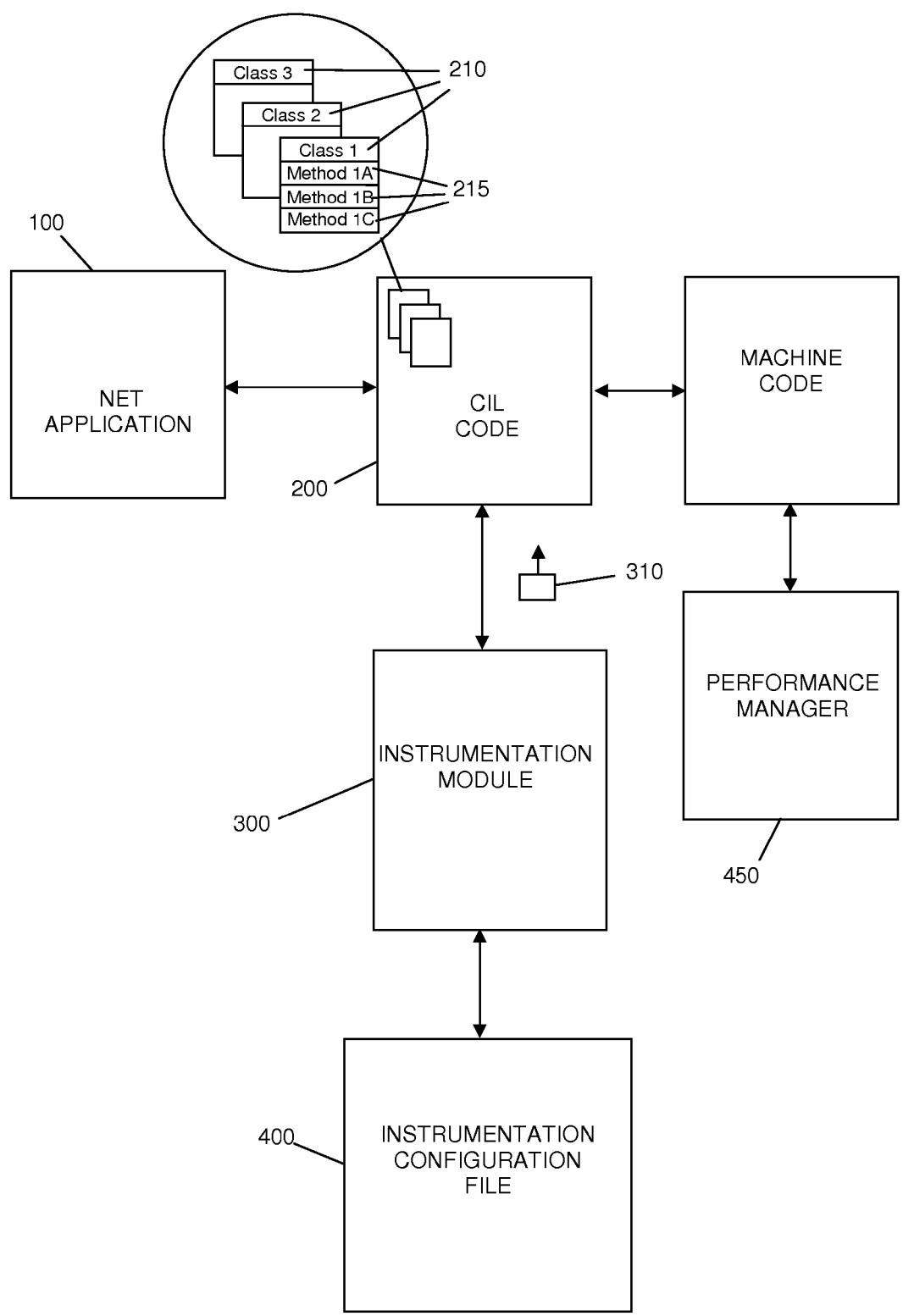
FIG. 1 is a schematic view of an exemplary environment in which an application may be instrumented with performance counters.

FIG. 1 provides a schematic view of an exemplary environment in which an application, such as .NET application 100, may be instrumented with performance counters. .NET Applications, such as application 100, are compiled into an intermediate language referred to as Common Intermediate Language ("CIL") (formerly referred to as Microsoft Intermediate Language, or "MSIL"). Such CIL code is represented in FIG. 1 at 200, and preserves the overall application structure of .NET application 100. During the compilation process, application classes and methods in the application source code of application 100 are converted into corresponding classes and methods in CIL code 200. During application execution, the Common Language Runtime (CLR) converts CIL code to machine code 210 and executes the instructions in the code. Conversion of an application method to the machine code is done before the first execution of a method.

As shown in FIG. 1, prior to compilation of the CIL code 200 into machine code 210, the method according to one aspect of a particularly preferred embodiment of the invention allows performance counters to be added to application 100 by instrumentation of CIL code 200. As will be explained in further detail below, instrumentation of CIL code 200 can be done either at compile time or at run time. An instrumentation module 300 is configured to communicate with CIL code 200, such that instrumentation module 300 may instrument methods 215 of application 100 with performance counters that are appropriate for such method. As discussed in greater detail below, the instrumentation code 310 that the instrumentation module 300 inserts into methods 215 comprises declarative instrumentation code to retrieve the appropriate values from application method runtime parameters and class member variables to name the method-specific performance counters, to calculate performance counter filter rules, and to set a value for the performance counter. The instrumentation code 310 preferably comprises an instrumentation type definition that is generated by instrumentation module 300 through consultation with an instrumentation configuration file 400, which instrumentation configuration file (as discussed in greater detail below) provides declarative definition for the particular performance counters that need to be added to a given application, such as application 100. More particularly, instrumentation configuration file 400 preferably contains a complete list of performance counters that need to be added to a given application, along with the necessary settings for each such performance counter.

Performance counters in the Windows Operating System have the following characteristics: counter class, counter name, counter instance name, window counter type, and counter value. Counter class, counter name and counter instance name uniquely identify a counter within the operating system. Counter class describes the type of object to which a counter belongs; counter name describes the value that a counter exposes; and counter instance describes an instance of an object for which the value is exposed. For example, one of the operating system standard counters is Processor Time for a process. For this counter, counter class is "process", counter name is "% Processor Time" and counter instance is a name of a process to which the counter belongs. Counter class and counter name are typically based on static information and need to be registered with the operating system during counter configuration. Counter instance name is typically created dynamically and may be based on runtime information. Counter value reflects a value for an object property described by the counter name. In our example, the counter value is an amount of processor time for a specific process at a certain point in that time. An application that exposes a performance counter is responsible for setting the value for a performance counter. Windows counter type is a helper information that tells the operating system how to interpret the value of a performance counter.

An application may expose performance counters that allow the operating system to observe application behavior. For example, we may have an order processing application ACME that processes orders for multiple companies. In our example, we can assume that a logic for processing an order is implemented in a method call processOrder and that this method takes a name of a company for which an order is processed as a parameter with the name "CompanyName," and an amount for the order as a parameter with the name "OrderAmount". The application may expose a performance counter that shows the number of large orders processed for each company, where (by way of non-limiting example) a large order is an order with an amount greater than $1,000. In this example, the counter class can be the application name "ACME", counter name can be "Large Order Count," and counter instance can be the name of a company for which orders are processed. Counter value is the number of orders processed. In order to expose the counter value, every time that the method processOrder is called, the application needs to look up the appropriate counter instance based on the parameter companyName and, after that, if a criteria for a counter matches, increment the counter value by one. In our case, the criteria or filtering rule for the counter is based on an order amount being greater than $1000. Thus, as depicted in this example, the methods of the invention may be used to insert counters in an already compiled application, to define rules for counter class, counter name, and counter instance name, to associate counters with a specific method, and to define filtering rules for a counter based on a method runtime context, which includes method parameters, member variables and static variables.

Figure 2:
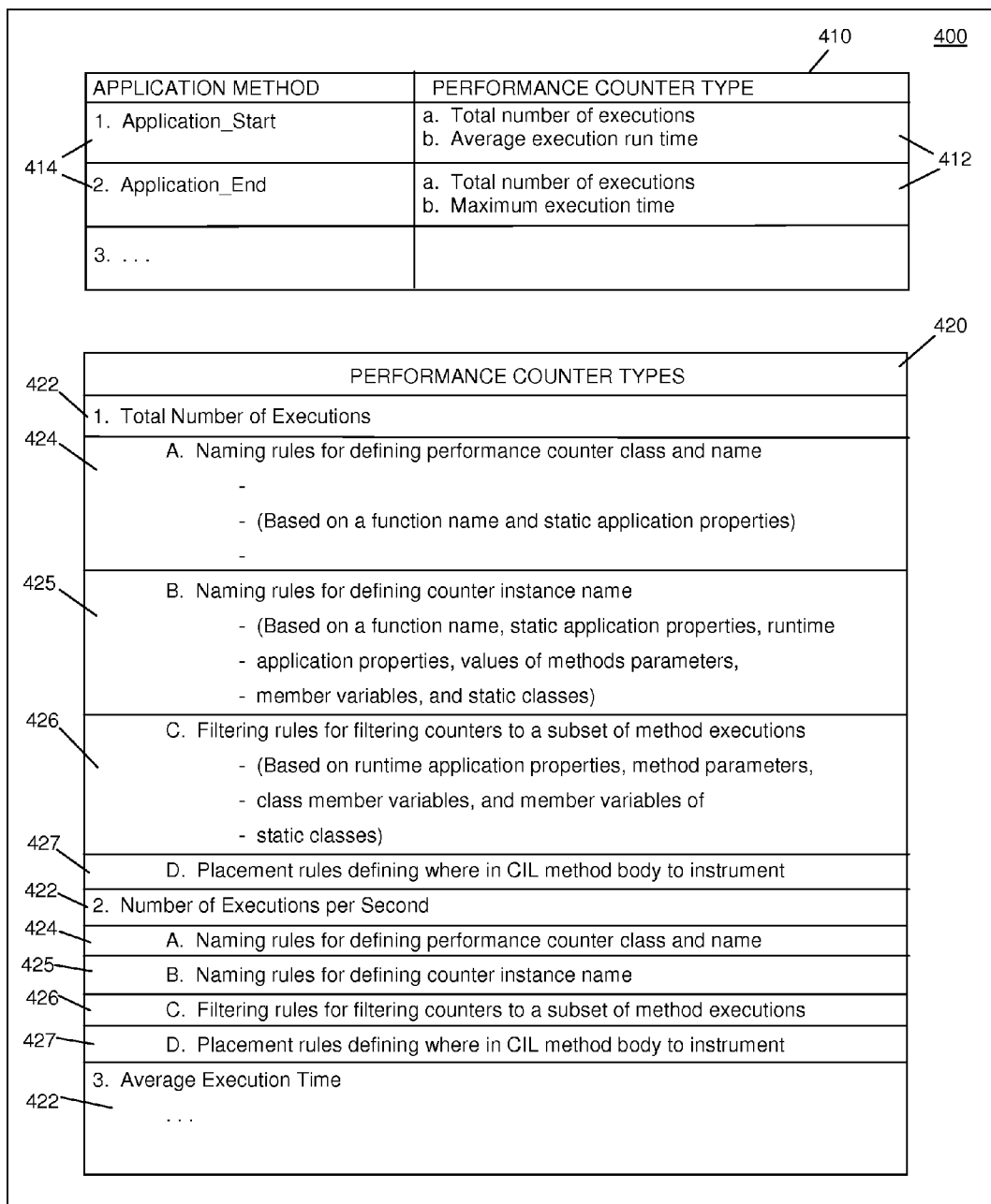
FIG. 2 is an exemplary representation of an instrumentation configuration file.

As shown more particularly in FIG. 2, instrumentation configuration file 400 includes an application method/performance counter type association table 410 and a performance counter type definition 420. Instrumentation module 300 locates class names and application method names that need to be instrumented from association table 410, and determines the associated type or types of performance counter that needs to be instrumented for that particular application method. Those of ordinary skill in the art will recognize that a single application method may be instrumented with multiple types of performance counters. For a given application method, instrumentation module 300 may use instrumentation configuration file 400 to generate an instrumentation type definition that comprises an identification of what performance counters need to be exposed, an identification of what conditions need to applied for method parameters, class member variables, and static classes, and what should be used for a performance counter name, and what should be used for the performance counter instance name. The instrumentation type definition thus defines the type of modification that is to be performed on the method body 215.

Performance counter type definition 420 in turn provides a list of performance counter types 422, and for each such performance counter type, a rule set 424 for defining performance counter class and name, a rule set 425 for defining performance counter instance name, a rule set 426 for filtering performance counters to a subset of method executions, and a rule set 427 for defining where in the CIL code 200 the instrumentation code 310 is to be inserted.

Available performance counter types 422 are varied, and may include (by way of non-limiting example) performance counters for the total number of executions, performance counters for the number of executions per second, performance counters for the average execution time, performance counters for the maximum execution time, and such other performance counters as will be apparent to those of ordinary skill in the art and as may be called for by a particular application. As mentioned briefly above, for each performance counter type, performance counter type definition 420 provides a rule set 424 for defining performance counter class and name, and a rule set 425 for defining counter instance name. The instrumentation module 300 uses regular expressions to describe such naming rules. It should be appreciated that while the invention uses regular expressions, any other language for parsing and building values from string values may be used for defining naming rules. Naming rules 424 for defining performance counter class and name are preferably based on at least a method name and static application properties. Naming rules 424 define the names of static application properties that are used for constructing counter class and counter name, what portions of values of those properties and what portion of the method name are used and in what order to combine them together to get the counter class and counter name. Naming rules 425 for defining performance counter instance name are preferably based on at least a method name, static application properties, runtime application properties, and may optionally also be based on values of method parameters, member variables, and static classes. Naming rules 425 define the names of static application properties, runtime application properties, method parameters, member variable and static variables that are used for constructing counter instance name, what portions of values of those properties and what portion of the method name are used, and in what order to combine them together to get the counter instance name. In the example above, we demonstrated how an instance name can be based on a value of a method parameter. We based instance name for the counter "Large Order Number" on a value of the method parameter "CompanyName".

Next, as mentioned above, rule set 426 provides rules for filtering performance counters to a subset of method executions. Such filtering rules are preferably based on at least runtime application properties, method parameters, class member variables, and member variables of static classes. Filtering rules 426 define the names of static application properties, runtime application properties, method parameters, member variable and static variables that are used for performance counter filtering and define filtering criteria for each used value. Filtering criteria for numeric values is defined using comparison operands, filtering criteria for string values defined using regular expressions. It should be appreciated that while the invention uses regular expressions and comparison operands, any other language for comparing string and numeric values may be used for filtering criteria rules. In the example above, we demonstrated how a filtering rule can be based on a value of a method parameter. We based filtering rule for counter "Large Order Number" on a value of the method parameter "orderAmount" and set "greater that $1000" as the filtering criteria.

Still further, rule set 427 provides placement rules defining where in the method body of the CIL code 200 the instrumentation code 310 should be inserted, and particularly whether the instrumentation should be inserted at the beginning of a method, the end of a method, or at a specific location inside of a method body. The particular location or locations at which such code should be inserted is determined by the type of performance counter that is to be inserted. For instance, count-based performance counters require that the instrumentation code be inserted only at the beginning of a method. Duration based performance counters, on the other hand, require instrumentation insertion at the beginning of a method and at the end of a method. Instrumentation inserted at the beginning of a method reads a method start time stamp and stores it. Instrumentation inserted at the end of the method reads a method finish time stamp and calculates duration based on the difference between start and finish time stamps. Because a CIL method may have multiple exit points, the instrumentation module 300 preferably detects all exit points and instruments all of them appropriately in the case when instrumentation is required at the end of a method. Exit points are detected by CIL return instruction. Each exit point is instrumented with the end of the method instrumentation for taking a finish time stamp and calculating duration.

After the CIL code has been instrumented, and the methods 215 are executed as machine code 210, the performance counters may generate the particular data (start time stamps, finish time stamps, etc.) and transfer that data to a performance manager 450 for processing.

Figure 3:
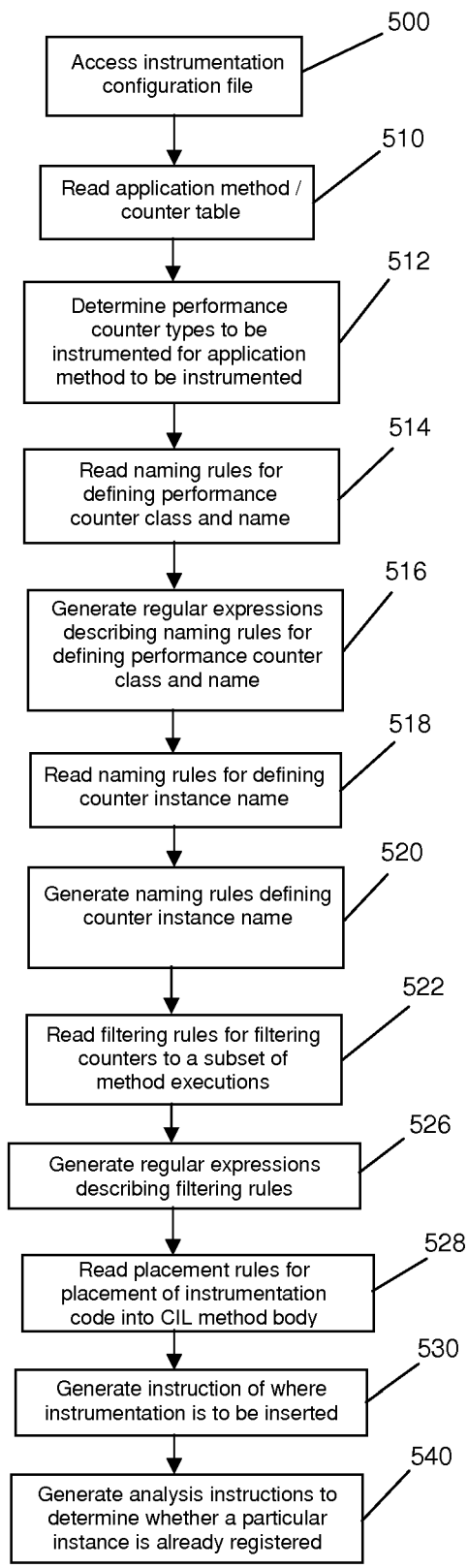
FIG. 3 is a flow diagram of the creation of instrumentation code suitable to instrument an application method body with performance counters.

FIG. 3 is a schematic view of an exemplary method that may be carried out by instrumentation module 300 of FIG. 1 to generate instrumentation code 310 to be used to instrument CIL code 200 with performance counters. At a first step 500, instrumentation module 300 accesses instrumentation configuration file 400, and at step 510 the instrumentation module 300 reads application method/performance counter type association table 410. At step 512, based in information in the instrumentation configuration file 400, instrumentation module 300 determines the particular performance counter types 412 that need to be instrumented for the particular class names and application method names 414 that are to be instrumented.

After the particular performance counter types that are to be instrumented are determined, instrumentation module 300 reads naming rules 424 for defining counter class and counter name, and retrieves the appropriate method name and static application properties as described above to define the counter class and counter name. At step 516, the instrumentation module 300 generates regular expressions describing such naming rules 424 for addition to instrumentation code 310. Likewise, at step 518, the instrumentation module reads naming rules 425 for the identified performance counter types to define the counter instance name, and retrieves the appropriate list of method parameters, class member variables and static classes member variables as described above to define the counter instance name. At step 520, the instrumentation module 300 generates naming rules describing such performance counter instance naming rules 425 for addition to instrumentation code 310. Those naming rules are configured to retrieve the corresponding values from an application method runtime parameters and class member variables, and to calculate the performance counter instance name.

At step 522, instrumentation module 300 reads filtering rules 426 for the identified performance counter types to filter the counters to a subset of method executions, and retrieves the appropriate list of method parameters, class member variables and static classes member variables as described above that are used in those filtering rules. At step 526, the instrumentation module 300 generates regular expressions describing such filtering rules 426 for addition to instrumentation code 310. Those filtering rules are configured to retrieve the corresponding values from application method runtime parameters and class member variables, calculate filtering expressions, and decide if those values match with the filtering rules.

At step 528, instrumentation module 300 reads placement rules 427 for placement of the instrumentation code into the CIL method body 200, and at step 530 adds to instrumentation code 310 appropriate instruction of where such instrumentation should be inserted.

Last, at step 540, the instrumentation module 300 completes the generation of the instrumentation code section 310 by generating and adding to instrumentation code 310 analysis instructions to determine whether a particular instance name is already registered with the operating system. The analysis instructions are configured such that: (i) if the instance name is not yet registered with the operating system, a new instance is created and the performance counter value is incremented on the required value; (ii) if the instance name is already registered with the operating system, then the instrumented code simply increments the value of the counter; and (iii) the instance based instrumentation logic executes only when the method runtime context, which includes method parameters, member variables and static variables, matches the filtering rules.

Figure 4:
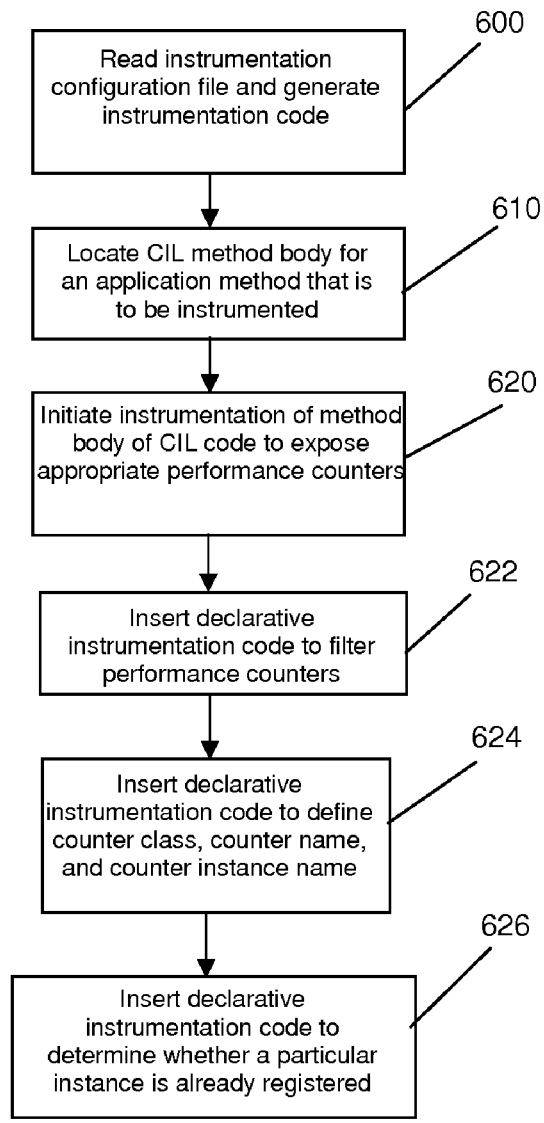
FIG. 4 is a flow diagram of the instrumentation of an application method body with instrumentation code to expose performance counters.

Referring next to FIG. 4, a schematic view of an exemplary method is shown that may be carried out by instrumentation module 300 of FIG. 1 to instrument CIL code 200 with performance counters using instrumentation code 310. At step 600, instrumentation module 300 reads the instrumentation configuration file, locates class names, application method names that need to be instrumented, and the required type of instrumentation as discussed in detail above with regard to FIG. 3, to generate instrumentation code 310. Next, at step 610, instrumentation controller 300 locates the CIL method body (i.e., the code that is being modified to expose appropriate performance counters) for an application method that is to be instrumented. In accordance with a particularly preferred embodiment of the invention, step 610 may be carried out either at compile time or at run time. The decision to perform the instrumentation at compile or runtime is based on the usage scenarios. Compile time instrumentation allows the instrumentation to be carried out only once during the compile time, but after that instrumentation is fixed. Runtime instrumentation requires executing instrumentation during each application load. Runtime instrumentation is more flexible but requires access to the application runtime environment and creates extra overhead during loading of the application. If the instrumentation is to be carried out at compile time, the instrumentation module 300 reads metadata for the assembly file for the application. The metadata contains a list of classes and methods defined in the assembly combined with information about the method body location within the assembly. The instrumentation module 300 looks up the method body address based on the method name from the list of methods in the assembly metadata and retrieves the method body. Likewise, in the case of run time installation, instrumentation module 300 subscribes on the Just-in-Time (JIT) compilation callback of the NET profiling API. The compilation callback has a function ID as callback parameters, which function ID uniquely identifies an application method. Instrumentation module 300 reads an application method body based on the function ID. Next, at step 620, instrumentation module 300 initiates instrumentation of the method body 215 to expose the appropriate performance counters. Instrumentation module 300 defines the type of modification to be performed on the CIL method body 215 by the type of instrumentation specified in the instrumentation configuration file 400, and more particularly by the instrumentation type definition created for a given application method that is to be instrumented with performance counters. As explained above, depending upon the particular performance counter being inserted, the instrumentation code 310 is inserted into the CIL method body 215 at a location determined by the placement rules 427 of performance counter type definition 420. Because a CIL method may have multiple exit points, the instrumentation manager detects all exit points and instruments all of them appropriately in the case when instrumentation is required at the end of a method. At step 622, based upon the filtering rules 426 in performance counter type definition 420, the instrumentation module 300 inserts declarative instrumentation code into method body 215 to: (a) retrieve the corresponding values from application method runtime parameters and class member variables; (b) calculate filtering expressions; and (c) decide if a method runtime context, which includes method parameters, member variables and static variables, matches with the filtering rules. Next, at step 624, based upon naming rules 425 for defining counter instance name and naming rules 424 for defining counter class and counter name, the instrumentation module 300 inserts declarative instrumentation code into method body 215 to: (a) retrieve the corresponding values from an application method runtime parameters and class member variables, (b) calculate the performance counter instance name and (c) calculate the performance counter class and counter name. Next, at step 626, instrumentation module 300 inserts analysis instructions formatted as declarative instrumentation code into method body 215 to determine whether or not a performance counter instance name is already registered, which analysis instructions are configured such that: (a) if the instance name is not registered, a new instance is created and the performance counter value is incremented on the required value; (b) if the instance name is already registered, the instrumented code just increments the value of the counter; and (c) the instance based instrumentation logic executes only when the method context matches the filtering rules.

While the above steps are recited as following a particular sequence, those of ordinary skill in the art will recognize that such steps need not be carried out in precisely the sequence recited, and may be varied to fit a particular application without departing from the spirit and scope of the invention.

Figure 5:
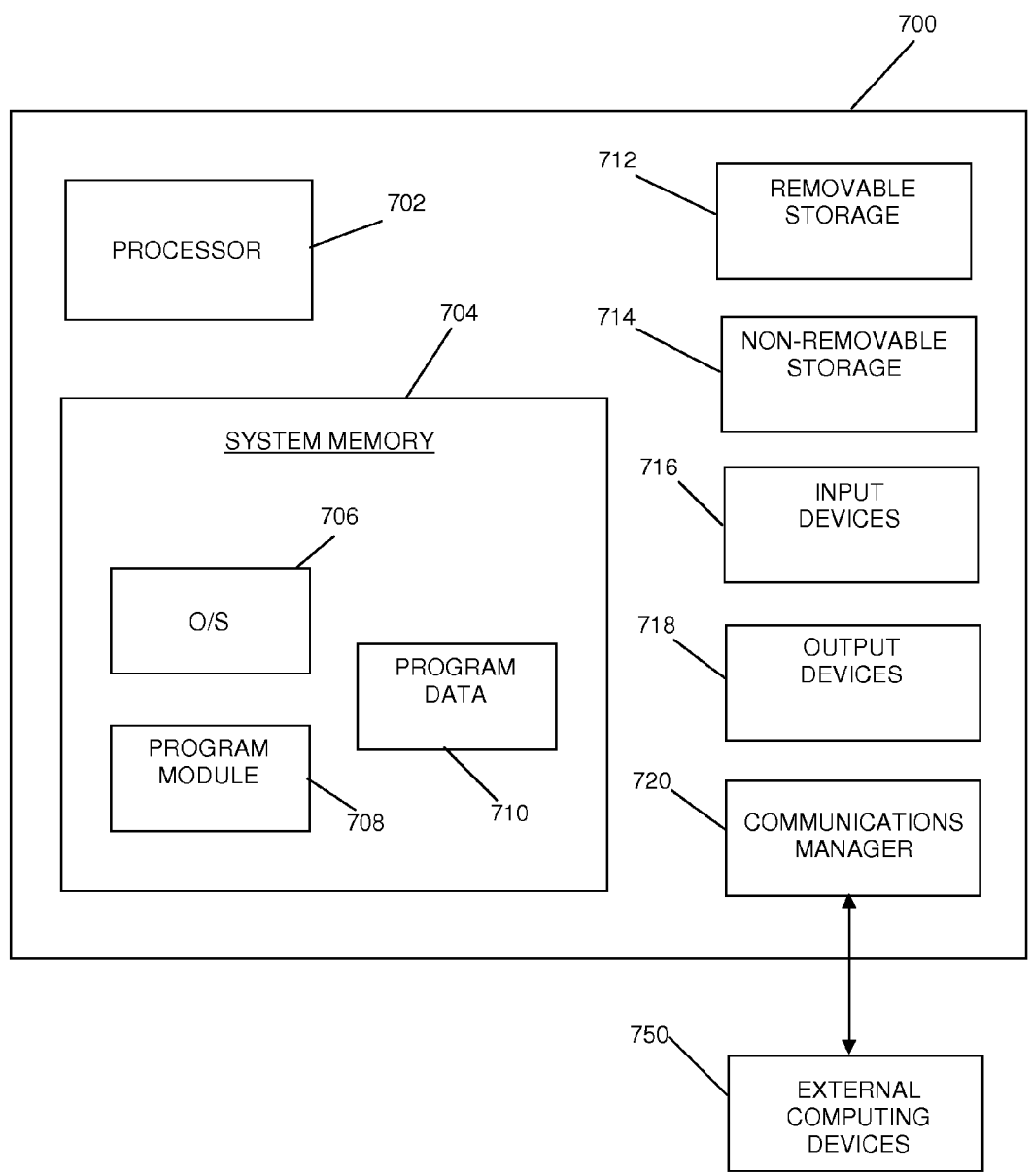
FIG. 5 is a block diagram of an exemplary computing device for use with the environment of FIG. 1 and the methods of FIGS. 3 and 4.

Instrumentation module 300 and the methods depicted in FIGS. 3 and 4 may be implemented on a computer system, an exemplary embodiment of which is shown in FIG. 5. A computing device 700 may include at least one processor 702 and system memory 704. System memory may be volatile (such as RAM), non-volatile (such as ROM, flash memory, etc.), or some combination of the two. System memory 704 may include an operating system 706, one or more program modules 708, and program data 710. Operating system 706 may include a component-based framework that supports components, objects, inheritance, polymorphism, and reflection, and may provide an object-oriented component-based application programming interface (API), such as that of the .NET™ Framework manufactured by Microsoft Corporation, Redmond, Wash. Computing device 700 may also include additional removable data storage devices 712 and non-removable data storage devices 714, such as, by way of non-limiting example, magnetic disks, optical disks, or tape. Such computer storage media may include volatile and non-volatile, removable and non-removable media implemented in any method or technology for storage of information, such as computer readable instructions, data structures, program modules, or other data. Each of system memory 704, removable storage 712, and non-removable storage 714 may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be accessed by computing device 700. Computing device 700 may also include one or more input devices 716, such as a keyboard, mouse, pen, voice input device, touch input device, etc., one or more output devices 718, such as a display, printer, speakers, etc., and such other devices as may be particularly suited to a specific application as will be evident to those of ordinary skill in the art. Moreover, computing device 700 may also include a communications manager 720 allowing communication between computing device 700 and other, external computing devices 750, such as over a computer network. Communications manager 720 may be implemented through computer readable instructions, data structures, program modules, or other data in a modulated data signal (i.e., a signal that has one or more of its characteristics set or changed in such a manner as to encode information in the signal), such as a carrier wave or other transport mechanism, and includes any information delivery media, and may include wired media such as a wired network or direct-wired connection, and wireless media such as acoustic, RF, infrared and other wireless media.

Referring again to FIG. 1, after method body 215 has been instrumented with appropriate performance counters and the particular application method or methods have been executed, data produced from the performance counters may be directed to a performance manager 450 for analysis and application management, as would typically be implemented for the reception, analysis, and use of performance counters in an application.

While instrumentation based performance counters can be used in a variety of usage scenarios, it is important to note that the primary usage scenarios enabled by the method described herein may include exposing performance counters for business activities and external service providers.

In accordance with another aspect of a preferred embodiment of the invention, the methods described herein may be used to define the boundary of business activity based on an application method boundary and application method context. The method name and method context are used for identifying business activity. For ASP.NET applications, the notion of activity is based on an ASP.NET page request. The ASP.NET page request boundary is defined by the ProcessRequest method. The method described herein instruments the ProcessRequest method with counters for number of requests and average execution time, defines counter instance naming rules 425 based on application name and page name, and filtering rules 426 based on page name. Counter instance naming rules 425 define the names of the counter instance as a concatenation of an application name string and a page name string. It should be appreciated that while the exemplary embodiment of the invention described above uses this naming approach for instance name, other naming approaches may be used for the instance name without departing from the spirit and scope of the invention. Filtering rules 426 use criteria based on page name to limit the performance counters to specific pages only.

For Web Service and WCF applications, the same approach may be used. The method described herein instruments the ProcessRequest method with counters for number of requests and average execution time, and defines counter instance naming rules 425 based on an application name and the WSDL action from the method context, and filtering rules 426 based on the WSDL action from the method context. Counter instance naming rules 425 define names of the counter instance as a concatenation of an application name string and the WSDL action from the method context string. Again, it should be appreciated that while the exemplary embodiment of the invention described above uses this naming approach for instance name, other naming approaches may be used for the instance name without departing from the spirit and scope of the invention. Filtering rules 426 use criteria based on the WSDL action to limit the performance counters to the WSDL actions only.

The method according to another aspect of a particularly preferred embodiment of the invention exposes performance counters for external service providers by instrumenting the methods responsible for communication with a service provider. Those methods are typically provided in libraries that implement interface for communication with an external service provider. An exemplary system and method for instrumenting .NET libraries, and particularly for instrumenting those libraries to discover application dependencies through instrumentation of such libraries, is described in copending and co-owned U.S. application Ser. No. 12/503,321, titled "Automatic Incremental Application Dependency Discovery Through Code Instrumentation" and filed on Jul. 14, 2009, the specification of which is incorporated herein by reference in its entirety. Some examples of external service providers that may be supported by the method described herein are Microsoft SQL Server, Oracle, ODBC data source, OLEDb data sources, IBM DB2, Web Services and WCF services. The methods described herein instrument application methods that execute requests against those external service providers. Information about the name of the external service provider is available in the context of those methods. For a database service provider, the service provider name is available as a part of the connection string. For Web Service and WCF service providers, information about the service provider name is available as part of the URI. The methods according to one aspect of a particularly preferred embodiment of the invention use the service provider name for defining the counter instance name and filtering options for performance counters. Counter instance naming rules 425 define names of the counter instance as the service provider name. Filtering rules 426 use criteria based on the service provider name to limit the performance counters to specific service providers only.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A computer implemented method for instrumenting performance counters in a .NET application, comprising:
    loading an instrumentation configuration to determine one or more .NET application methods requiring performance counter instrumentation and one or more types of performance counter that are to be instrumented for each such .NET application method;
    locating a segment of Common Intermediate Language method body that is to be instrumented with said one or more types of performance counter; and
    modifying the segment of Common Intermediate Language method body to expose one or more types of performance counter, wherein said modifying step further comprises:
        inserting declarative instrumentation filtering code into said Common Intermediate Language method body, said declarative instrumentation filtering code comprising computer executable instructions configured to:
            retrieve values from application method runtime parameters and class member variables;
            calculate filtering expressions; and
            determine if a method runtime context matches a filtering rule set associated with said one or more types of performance counters that are to be instrumented.

2. The method of claim 1, further comprising the step of incrementing an instrumented performance counter upon determining that said instrumented performance counter was previously registered with an operating system on which said .NET application runs.

3. The method of claim 1, wherein said modifying step further comprises:
    inserting declarative instrumentation naming code into said Common Intermediate Language method body, said declarative instrumentation naming code comprising computer executable instructions configured to:
        retrieve values from application method runtime parameters and class member variables; and
        calculate a performance counter class, a performance counter name, and a performance counter instance name.

4. The method of claim 3, further comprising the step of inserting declarative instrumentation analysis code into said Common Intermediate Language method body, said declarative instrumentation analysis code comprising computer executable instructions configured to determine whether or not a performance counter instance name was previously registered with an operating system on which said .NET application runs.

5. The method of claim 4, wherein said declarative instrumentation analysis code is further configured to create a new performance counter instance and instrument a performance counter value upon determining that said performance counter instance name was not previously registered.

6. The method of claim 4, wherein said declarative instrumentation analysis code is further configured to increment a performance counter value upon determining that said performance counter instance name was previously registered.

7. The method of claim 4, wherein said declarative instrumentation analysis code is further configured to execute only upon said method runtime context matching said filtering rule set.

8. The method of claim 1, said reading step further comprising:
    reading a naming rule set in said instrumentation configuration defining counter class and counter name, and retrieving a method name and static application properties to define said counter class and counter name.

9. The method of claim 8, further comprising the step of generating regular expressions describing naming rules for defining counter class and counter name.

10. The method of claim 1, said reading step further comprising:
    reading a naming rule set in said instrumentation configuration defining counter instance name for a designated performance counter type, and retrieving one or more method parameters, class member variables, and static classes member variables to define said counter instance name.

11. The method of claim 10, further comprising the step of generating naming rules for defining counter instance name.

12. The method of claim 11, wherein said naming rules for defining counter instance name further comprise computer executable instructions configured to retrieve values from application method runtime parameters and class member variables, and to calculate a performance counter instance name.

13. The method of claim 1, said reading step further comprising:
    reading a filtering rule set in said instrumentation configuration associated with said one or more types of performance counter that are to be instrumented, wherein said filtering rule set comprises computer executable instructions configured to filter said one or more types of performance counters to a subset of method executions; and retrieving one or more method parameters, class member variables, and static classes member variables that are used by said filtering rule set.

14. The method of claim 13, further comprising the step of generating filtering rules for filtering said one or more types of performance counters to a subset of method executions.

15. The method of claim 14, wherein said filtering rules further comprise computer executable instructions configured to retrieve values from application method runtime parameters and class member variables, to calculate filtering expressions, and to determine whether the values match the filtering rules.

16. The method of claim 1, said reading step further comprising:
generating analysis instructions comprising computer executable instructions configured to determine whether a performance counter instance name was previously registered with an operating system on which said .NET application runs.

* * * * *